(12) United States Patent
Chiang et al.

(10) Patent No.: US 10,678,984 B2
(45) Date of Patent: Jun. 9, 2020

(54) SYSTEMS FOR REAL-TIME AVAILABLE DELIVERY CAPABILITY DETERMINATION OF LARGE-SCALE DISTRIBUTION NETWORKS

(71) Applicant: Bigwood Technology, Inc., Ithaca, NY (US)

(72) Inventors: Hsiao-Dong Chiang, Ithaca, NY (US); Sheng Hao, Ithaca, NY (US); Wen-Liang Liu, Xiamen (CN); Jun Xiong, Xiamen (CN); Jin-Xiang Chen, Xiamen (CN); Guo-Wei Chen, Xiamen (CN); Yong-Feng Zhang, Jinan (CN); Gilburt Chiang, Ithaca, NY (US)

(73) Assignees: Bigwood Technology, Inc., Ithaca, NY (US); State Grid Xiamen Electric Power Supply Company, Xiamen (CN); ShanDong Global Optimal Big Data Science and Tech, Jinan (CN); Tianjin University, Tianjin (CN)

( * ) Notice: Subject to any disclaimer, the term of this patent is extended or adjusted under 35 U.S.C. 154(b) by 502 days.

(21) Appl. No.: 15/497,204

(22) Filed: Apr. 26, 2017

(65) Prior Publication Data
US 2018/0314769 A1    Nov. 1, 2018

(51) Int. Cl.
*G06Q 50/06* (2012.01)
*G06F 30/3323* (2020.01)
(Continued)

(52) U.S. Cl.
CPC ........ *G06F 30/3323* (2020.01); *G06F 30/327* (2020.01); *G06F 30/367* (2020.01);
(Continued)

(58) Field of Classification Search
CPC .. G06F 17/504; G06F 17/5036; G06F 17/505; G06F 2217/80; G06F 2217/78;
(Continued)

(56) References Cited

U.S. PATENT DOCUMENTS

2013/0218494 A1* 8/2013 Chiang ................ G01R 21/006
702/61

OTHER PUBLICATIONS

Matthew Varghese et al., "Design and implementation of real-time voltage stability analysis at Caiso", 2008, IEEE Power and Energy Society General Meeting-Conversion and Delivery of Electrical Energy in the 21st Century, pp. 1-6.*

(Continued)

*Primary Examiner* — Juan C Ochoa
(74) *Attorney, Agent, or Firm* — Tong J. Lee

(57) ABSTRACT

The available delivery capability (ADC) of a power distribution network with respect to a power transaction is evaluated in real-time. The power transaction involves simultaneous power deliveries from power sources in a source area to loads in a sink area. First, a list of contingencies are ranked in the power distribution network with respect to static security constraints to obtain a subset of top-ranked contingencies. For each top-ranked contingency in the subset, a representation of the power transaction in a steady state of the power distribution network, in a form of parameterized three-phase power flow equations, is solved to obtain a corresponding power delivery capability (PDC) and a corresponding binding constraint among the static security constraints. The reliability of the power transaction in the power distribution network is then evaluated based on, at least in part, a first contingency PDC which is a smallest PDC among obtained corresponding PDCs.

16 Claims, 7 Drawing Sheets

(51) Int. Cl.
*H02J 3/06* (2006.01)
*G06F 30/327* (2020.01)
*G06F 30/367* (2020.01)
*H02J 3/38* (2006.01)
*H02J 3/14* (2006.01)
*G05F 1/66* (2006.01)
*H02J 13/00* (2006.01)
*H02J 3/18* (2006.01)
*H02J 3/16* (2006.01)
*H02J 3/00* (2006.01)
*G06F 119/06* (2020.01)
*G06F 119/08* (2020.01)

(52) U.S. Cl.
CPC .................. *H02J 3/06* (2013.01); *G05F 1/66* (2013.01); *G06F 2119/06* (2020.01); *G06F 2119/08* (2020.01); *G06Q 50/06* (2013.01); *H02J 3/001* (2020.01); *H02J 3/003* (2020.01); *H02J 3/14* (2013.01); *H02J 3/16* (2013.01); *H02J 3/1821* (2013.01); *H02J 3/382* (2013.01); *H02J 13/00* (2013.01); *H02J 2203/20* (2020.01)

(58) Field of Classification Search
CPC .. G06F 30/3323; G06F 30/327; G06F 30/367; G06F 2119/06; G06F 2119/08; H02J 3/06; H02J 3/16; H02J 2003/007; H02J 2003/003; H02J 3/1821; H02J 2003/001; H02J 13/00; H02J 3/14; H02J 3/382; H02J 3/001; H02J 3/003; H02J 2203/20; G06Q 50/06; G05F 1/66

USPC ...................................................... 703/18, 2
See application file for complete search history.

(56) References Cited

OTHER PUBLICATIONS

Jian Liu and Hsiao-Dong Chiang, "Maximizing available delivery capability of unbalanced distribution networks for high penetration of distributed generators", 2014, IEEE Transactions on Power Delivery 32.3, pp. 1196-1202.*

Lorenzo Ferrari et al., "The pulse coupled phasor measurement units," 2014, IEEE International Conference on Smart Grid Communications (SmartGridComm), pp. 1-6.*

Jianquan Zhao et al., "A new contingency parameterization CPF model and sensivity method for voltage stability control", 2005, IEEE Power Engineering Society General Meeting , pp. 1-7.*

Hsiao-Dong Chiang and Hao Sheng, "Available delivery capability of general distribution networks with renewables: formulations and solutions", 2015, IEEE Transactions on Power Delivery 30.2, pp. 898-905.*

Khaled Abdul-Rahman et al., "Considerations of reactive power/voltage control in Caiso market operations", 2011, IEEE Power and Energy Society General Meeting, 6 pages.*

Sheng, et al., CDflow: A Practical Tool for Tracing Stationary Behaviors of General Distribution Networks, IEEE Transactions on Power Systems, vol. 29, No. 3, May 2014, pp. 1365-1371.

* cited by examiner

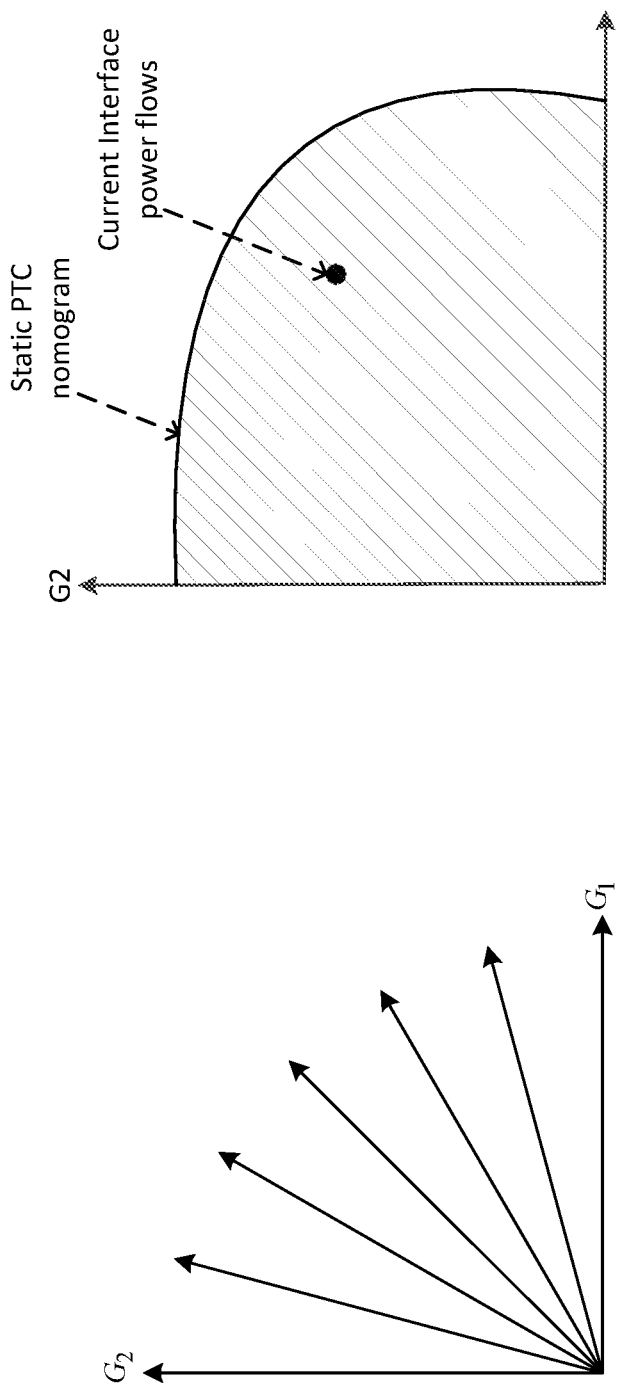
FIG. 6
FIG. 5
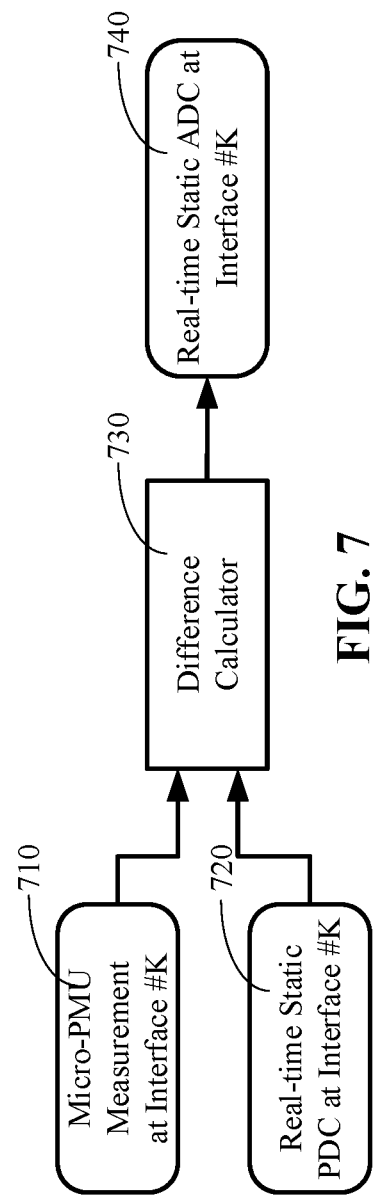
FIG. 7

SYSTEMS FOR REAL-TIME AVAILABLE DELIVERY CAPABILITY DETERMINATION OF LARGE-SCALE DISTRIBUTION NETWORKS

TECHNICAL FIELD

Embodiments of the invention pertain to a large-scale distribution network for power delivery from a collection of sources to a collection of sinks.

BACKGROUND

Recent years have witnessed a growing trend towards the development and deployment of distributed generation (DG). This trend, in combination with new distributed generator technologies, has profoundly changed the traditional analysis, design, and control paradigm of distribution networks. The trend of integrating a wide variety of distributed resources into distribution networks also imposes great operational challenges; in particular, large-scale renewable energy penetration may cause overloading that occurs in distribution lines and transformers, voltage violation, and stability problems. The integration of various types of renewable resources also introduces another challenge on the capability of a distribution network to deliver powers from the locations of renewable resources to loads. The available delivery capability (ADC) of a distribution network of delivering powers from a collection of sources to a collection of sinks is defined as the maximum power that can be delivered over the existing amount for which there are no thermal overloads, voltage violations, and voltage collapse.

The concept of ADC in distribution networks is closely related to the concept of available transfer capability (ATC) in transmission networks. In 1996, the Federal Energy Regulatory Commission defined the term "available transfer capability" in transmission system to be posted in the Open Access Same-Time Information System to inform all energy market participants of the maximum power transfer capability for a distribution network. ATC has been used to guide power system operations for setting transfer limits on transmission corridors and key tie-lines for years. The concept of ATC can be extended into distribution networks to be "a measure of delivery capability in the physical distribution network for further delivery activity over and above already committed uses."

The widespread use of distributed power generations in distribution networks imposes significant changes on operating conditions such as reverse power flow, voltage rise, increased fault levels, reduced power losses, island mode operation, harmonic problem and stability problem. System operators now face more new, unknown power flow patterns than ever before. At the same time, economic pressure on the electricity market and on grid operators, coupled with limited investment in new distribution networks, push distribution networks close to their stability limits. Hence, there is a need to monitor and calculate the ADC based on current operating conditions.

SUMMARY

In one embodiment, there is provided a computer-implemented method for real-time evaluation of available delivery capability of a power distribution network with respect to a power transaction, wherein the power transaction includes simultaneous power deliveries from a collection of power sources in a source area to a collection of loads in a sink area. The method comprises: ranking a list of contingencies in the power distribution network with respect to static security constraints to obtain a subset of top-ranked contingencies; for each top-ranked contingency in the subset, solving a representation of the power transaction in a steady state of the power distribution network, in a form of parameterized three-phase power flow equations, to obtain a corresponding power delivery capability (PDC) and a corresponding binding constraint among the static security constraints; and evaluating reliability of the power transaction in the power distribution network based on, at least in part, a first contingency PDC which is a smallest PDC among obtained corresponding PDCs.

In another embodiment, there is provided a system for real-time evaluation of available delivery capability of a power distribution network with respect to a power transaction, wherein the power transaction includes simultaneous power deliveries from a collection of power sources in a source area to a collection of loads in a sink area. The system comprises: memory to store static security constraints and a list of contingencies of the power distribution network; and one or more processors coupled to the memory. The one or more processors are operative to: rank the list of contingencies in the power distribution network with respect to the static security constraints to obtain a subset of top-ranked contingencies; for each top-ranked contingency in the subset, solve a representation of the power transaction in a steady state of the power distribution network, in a form of parameterized three-phase power flow equations, to obtain a corresponding power delivery capability (PDC) and a corresponding binding constraint among the static security constraints; and evaluate reliability of the power transaction in the power distribution network based on, at least in part, a first contingency PDC which is a smallest PDC among obtained corresponding PDCs.

In yet another embodiment, a non-transitory computer readable storage medium is provided. The non-transitory computer readable storage medium includes instructions that, when executed by a computing system, cause the computing system to perform the aforementioned method for real-time evaluation of available delivery capability of a power distribution network with respect to a power transaction. The power transaction includes simultaneous power deliveries from a collection of power sources in a source area to a collection of loads in a sink area. The method comprises: ranking a list of contingencies in the power distribution network with respect to static security constraints to obtain a subset of top-ranked contingencies; for each top-ranked contingency in the subset, solving a representation of the power transaction in a steady state of the power distribution network, in a form of parameterized three-phase power flow equations, to obtain a corresponding power delivery capability (PDC) and a corresponding binding constraint among the static security constraints; and evaluating reliability of the power transaction in the power distribution network based on, at least in part, a first contingency PDC which is a smallest PDC among obtained corresponding PDCs.

BRIEF DESCRIPTION OF THE DRAWINGS

FIG. 5 illustrates a stress pattern that spans the entire feasible generation/load stress space according to one embodiment.

FIG. 6 illustrates a real-time static ADC in a nomogram according to one embodiment.

FIG. 7 illustrates the computation of one-dimensional real-time static ADC according to one embodiment.

DETAILED DESCRIPTION

Figure 1:
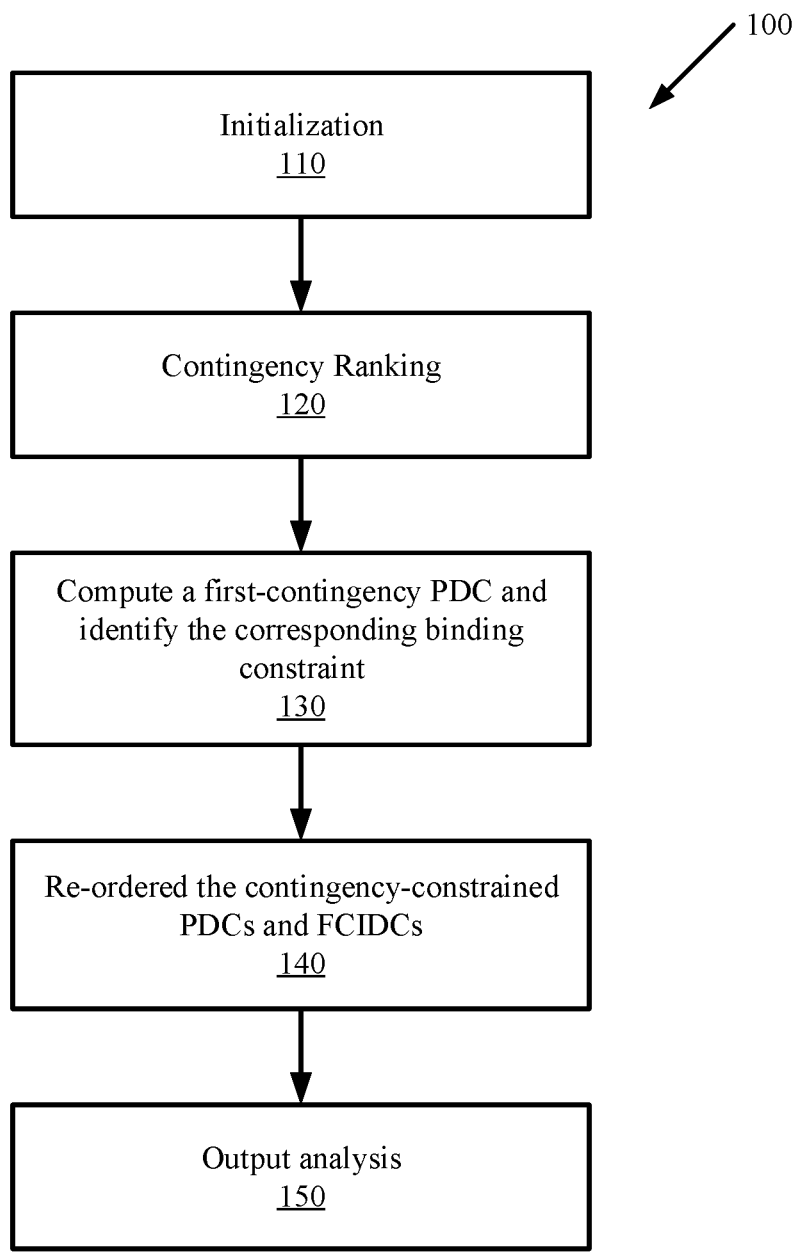
FIG. 1 is a flow diagram illustrating an outline of an on-line ADC method according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

A physical distribution network is subject to operational constraints (such as voltage violation constraints) as well as physical constraints (such as thermal-limit constraints and static stability limit constraint). In this disclosure, ADC is defined as the available capability of a distribution network to deliver power from the source area (such as a collection of power source nodes to which renewable energies are connected) to the sink area (such as a collection of loads) without thermal overloads, voltage violations, and voltage collapse. From both operational and planning viewpoints, it is important to accurately calculate the ADC of a distribution network and to fully support the renewable resources.

Embodiments of the invention provide a system and method for accurately determining real-time ADC and the required ancillary service of large-scale distribution networks subject to the following static security constraints of a list of credible contingencies: line thermal limits, bus voltage limits, and voltage stability (steady-state stability) constraints.

The terms "security" and "stability" are used interchangeably hereinafter. A power system is secure if it is able to maintain a normal and stable operation when encountering contingencies, where contingencies are discrete events such as failure of devices (e.g., lines, generators, shunts, etc.). A contingency is "credible" if its occurrence is plausible and/or falls in a range of likelihood.

An integrated system is described herein for monitoring actual power flow and calculating the ADC at selected key interfaces in distribution networks. The integrated system provides distribution network operators with critical information, including at least the following: assessment of real-time ADC of a distribution network subject to static stability constraints (a.k.a. static security constraints) of a list of contingencies; power delivery capability and power delivery limits at key interfaces subject to static stability constraints of a list of contingencies; and the limiting contingencies and binding constraints for power delivery limits.

The outputs of the integrated system include at least the following: overall status of the distribution network, such as system-wide ADC, the corresponding binding constraints (e.g. line thermal limits, bus voltage limits, or voltage stability (steady-state stability) constraints) and the limiting contingencies; power delivery limits at key interfaces, the corresponding limiting contingencies (e.g. contingency details such as fault type, fault location, and circuits lost) and the corresponding binding constraints; and available power delivery capability and the corresponding limiting contingencies (e.g. contingency details such as fault type, fault location, and circuits lost).

Power delivery capability (PDC) refers to the capacity and ability of a distribution network to allow for the reliable delivery of electric power from a source area of supply to a sink area of need by way of all distribution lines between two areas under assumed system operating conditions. The assumed (i.e. current and near-term) system operating conditions include several projected factors such as the expected load demands, near-term real power dispatch, the system configuration, and the scheduled power delivery among the distribution networks.

The power delivery capabilities are generally described by the first contingency incremental delivery capability (FCIDC) or first contingency total delivery capability (FCTDC) for predicted peak load conditions. The FCIDC is the amount of electric power incremental above a normal base power that can be transferred in a reliable manner based on all of the following conditions:

(1) For the existing or planned system configuration, and with normal (i.e. pre-contingency) operating procedures in effect, all facility loadings are within normal ratings and all voltages are within normal limits.

(2) After a disturbance that results in the loss of any single electric system element, and after the operation of any automatic operating systems, but before any post-contingency operator-initiated system adjustments are implemented, all distribution facility loadings are within emergency ratings and all voltages are within emergency limits.

Note that condition (1) is related to the static security constraints under the first contingency of the pre-contingency operating conditions while condition (2) is concerned with the static security constraints of the post-contingency operating conditions.

PDC of a distribution network depends heavily on underlying power transactions. The PDC and its associated binding constraints of a distribution network can be very different for different proposed power transactions. Hence, it is important to specify the proposed power transaction in calculating the PDC with respect to the power transaction. Given a set of proposed power transactions, the objective of a delivery capability computation is to determine the maximum delivery value for a proposed power transaction or simultaneous power transactions. The problem formulation upon which the calculation is based have the following general characteristics: (C1) it represents a realistic operating condition or expected future operating condition; (C2) it conforms with the requirements of the delivery capability definitions; and (C3) it considers single contingency facility outages that result in conditions most restrictive to power deliveries.

To achieve (C1), the activation of the following control devices normally expected in any operating procedures are included in the simulations: (i) Switchable shunts and static VAR compensators, (ii) Under-Load Tap Changer (ULTC) Transformers, (iii) ULTC phase shifter, (iv) Static tap changer and phase shifter. In order to completely describe the actual power flow in the entire distribution network, a detailed nonlinear power flow analysis of the interconnected system is performed. To achieve (C2), it is important to accurately represent the proposed power transaction. To achieve (C3), the static security assessments of the first contingency from a contingency list on a distribution network is required.

The basic information for the system-wide PDC evaluations includes the following: (1) the current operating condition (obtained from the state estimator and the topological analyzer) of the distribution network, (2) a base case distribution network model with control devices, reactive power generation limits, (3) load forecast (or estimate) for the next period (e.g. next 15 minutes) of each bus, (4) a set of proposed power transactions, such as (i) a point-to-point MW transaction, (ii) a slice-of-the-system sale, (iii) a network service, or (iv) a reactive ancillary service, (5) generation forecast for energies (e.g. renewable energies such as wind power and solar power) for the next period (e.g. next 15 minutes), and generation scheduling (or generation participation factor) of dispatchable generators (such as micro turbines, fuel cells) to accommodate load increases or/and to accommodate power transactions, and (6) a list of credible contingencies.

In addition to the above basic information, the information of how to model the control actions during the process of step increases in loads and generations is needed. These control actions include the static VAR compensator, Thyristor-Controlled Series Compensation (TCSC), tap changer, Load Tap Changer (LTC) transformer voltage control, phase-shiftier controls, and capacitor/reactor voltage control, etc.

In the following, a method for representing a power transaction or a set of power transactions is described. The notion of generation/load margin to a static security limit is also discussed. Given a load demand vector (i.e. real and reactive load demands at each load bus) and a real generation vector (i.e. real power generation at each generator bus), one can compute the state of the distribution network (i.e. the complex voltage at each bus) by solving a set of three phase power flow equations.

Let $P_i \equiv P_{gi} - P_{di}$ and $Q_i \equiv Q_{gi} - Q_{di}$. The lowercase g represents generation and the lowercase d represents load demand. The set of three phase power flow equations can be represented in a compact form as:

$$f(x) \equiv \begin{bmatrix} P(x) - P \\ Q(x) - Q \end{bmatrix} = 0, \text{ where } x = (v_a, v_b, v_c, \theta_a, \theta_b, \theta_c) \quad (1)$$

Now one can investigate the steady-state behavior of the distribution network under slowly varying loading conditions and distributed generations. For example, if one needs to trace the distribution network state from the base-case generation/load condition $[P_d^0, Q_d^0, P_g^0]$ to a new generation/load condition $[P_d^1, Q_d^1, P_g^1]$, then one can parameterize the set of power flow equations as:

$$F(x,\lambda) \equiv f(x) - \lambda b = 0, \quad (2)$$

where the power transaction vector b is:

$$b \equiv \begin{bmatrix} P^1 - P^0 \\ Q^1 - Q^0 \end{bmatrix}. \quad (3)$$

It follows that the parameterized three phase power flow equations become the base-case power flow equations when $\lambda = 0$, $$F(x, 0) = \begin{bmatrix} P(x) - P^0 \\ Q(x) - Q^0 \end{bmatrix} = 0 \quad (4)$$

And when $\lambda = 1$, the distribution network is at the new generation/load condition $[P_d^1, Q_d^1, P_g^1]$ and can be described by:

$$F(x, 1) = f(x) - b = \begin{bmatrix} P(x) - P^1 \\ Q(x) - Q^1 \end{bmatrix} = 0. \quad (5)$$

As shown in the above procedure, one can investigate the effects of varying real power generations as well as varying load demands on distribution network steady-state behaviors. In fact, one can parameterize any change in PQ loads in conjunction with any change in P generations by selecting an appropriate vector b. The set of parameterized power flow equations is a representation of the proposed power transaction in a steady state of the power distribution network.

Applying the above general setting to the problem of computing PDC of distribution networks, the vector b can be used to represent one or several of the following power transactions and distribution service:

Point-to-point MW transaction: the real power at one load bus of the sink area varies while the others remain fixed, and the real power at one generator bus of the source area varies while the others remain fixed.

Slice-of-the-system sale: both the real and reactive power demand at a load bus of the sink area vary and the real power generation at some collection of generators of the source bus varies while the others are fixed.

Network service: the real and/or reactive power demands at some collection of load buses of the sink area vary and the real power generation at some collection of generators of the source bus varies while the others are fixed.

Reactive ancillary service: the reactive power demands at a specific or some collection of load buses of the sink area vary and are balanced by the reactive generation within the same area or at other surrounding areas.

The vector b is called a power transaction vector, and the scalar $\lambda$ is called the generation/load condition number (a.k.a. the condition number). The power transaction vector b can be used to represent a transaction involving simultaneous power deliveries by summing each power transaction vector, i.e. $b = \Sigma b_i$, $i = 1, 2, \ldots$ where the vector $b_i$ represents the ith power transaction.

The introduction of the power transaction vector and the condition number enables evaluate rigorous evaluation of available delivery capability of a distribution network satisfying the general characteristics (C1), (C2) and (C3) stated above. For instance, one can compute the maximum value of the condition number so that the resultant distribution network satisfies all the constraints, which are required in the general characteristics (C2) and (C3).

Due to the nonlinear nature of distribution networks, power delivery capabilities between two areas and their associated binding constraints depend on a set of system conditions. The power delivery capabilities and their associated binding constraints can be significantly different for any other set of system conditions, such as a different set of system load demands, a different network configuration, a different power transaction, or a different generation dispatch pattern. Hence, delivery capability computations must be sufficient in system modeling and scope to ensure that all equipment as well as system limits of the entire distribution network are properly taken into account.

In general, power delivery cannot be forced through pre-determined distribution paths, unless the paths are physically controlled by control devices such as phase-shifter. Therefore, power delivery will be distributed among all parallel paths according to the laws of physics. As a result, simple bi-lateral contracts between neighboring areas may not be sufficient to describe the actual power flow. Detailed nonlinear distribution network models are used for the analysis. In addition, given a set of proposed power transactions, the binding constraint which limits the system's PDC can be the physical operating limits of an equipment/facility, or the bus voltage constraint in the entire system including the source, the sink as well as all neighboring areas, or the steady-state stability limit. The limiting equipment/facility, or the bus with voltage violation, or even the binding contingency may not occur in the two areas involving power delivery. To address this issue, a comprehensive modeling of the distribution system is necessary for the development of an effective real-time ADC method.

In the following, a real-time ADC method (also referred to as the on-line ADC method, on-line static ADC method, or on-line method) is described for computing real-time static security constrained power delivery limit (i.e. on-line static PDL) with respect to a specified generation/load variation vector. In the following, the terms "real-time" and "on-line" are used interchangeably.

Given a proposed power transaction or a proposed simultaneous power transactions (e.g., (i) a point-to-point MW transaction, (ii) a slice-of-the-system sale, (iii) a network service, or (iv) a reactive ancillary service), and the following information: (1) a base case distribution network model with control devices, reactive power generation limits, schemes of real power dispatches, say due to participation factor, etc., (2) the current operating condition (obtained from the state estimator and the topological analyzer), (3) operating policy, (4) a set of credible contingencies and (5) voltage constraints, thermal-limit constraints, steady-state security limit constraints, the real-time ADC method computes the static-security constrained PDC (i.e. static PDC) for the proposed power transaction of the distribution network with the following control laws and satisfying all the constraints stated above.

Control Law. The on-line ADC method allows the participation of generators, loads, ULTC taps, phase-shifter settings, and shunt capacitors as controls to maximize available delivery capability. The control laws can be classified as: active control and passive control. Active control laws are the control laws whose objective function is to maximize power delivery capability through their control actions while passive control laws are the control laws whose objective function is to remove various types of security violations through their control actions which can also increase power delivery capability. The actions of active control laws can be formulated as a constrained optimization problem whose objective function is the delivery capability while the actions of passive control laws can be formulated as a constrained optimization problem whose objective function is not the delivery capability.

FIG. 1 is a flow diagram illustrating an outline of an on-line ADC method 100 according to one embodiment. The method 100 evaluates the static PDC of a distribution network with respect to a set of proposed power transactions subject to static security constraints. In one embodiment, the method 100 includes five stages.

Stage 1 is initialization (block 110). This stage builds a power delivery vector to represent (mathematically) the proposed power delivery transaction and form the parameterized three phase power flow equations by incorporating the power transaction vector b into the base-case power flow equations.

In Stage 2, contingency ranking is performed for static security violation (block 120).

In Stage 3, a first-contingency PDC is computed and the corresponding binding constraint is identified (block 130).

In Stage 4, the contingency-constrained PDCs and FCIDCs are re-ordered (block 140).

Stage 5 is output analysis (block 150).

Before describing the details of each stage, a number of ranking schemes for the contingency ranking in Stage 2 is explained first. It is imperative in the process of computing available delivery capability to take into account all credible contingencies. A simultaneous delivery capability solution can be regarded as secure only if it can sustain all credible contingency cases. The strategy of using effective schemes to rank all credible contingencies and of applying detailed analysis programs only to critical contingencies is widely accepted. Adopting this strategy, the on-line method employs three look-ahead ranking schemes for identifying critical contingencies in terms of three static security constraints; i.e. thermal limits, voltage limits and steady-state stability limits. With these ranking schemes, the on-line method has the ability to identify top contingencies, find the associated binding constraints, and compute the corresponding simultaneous available delivery capability.

Figure 2:
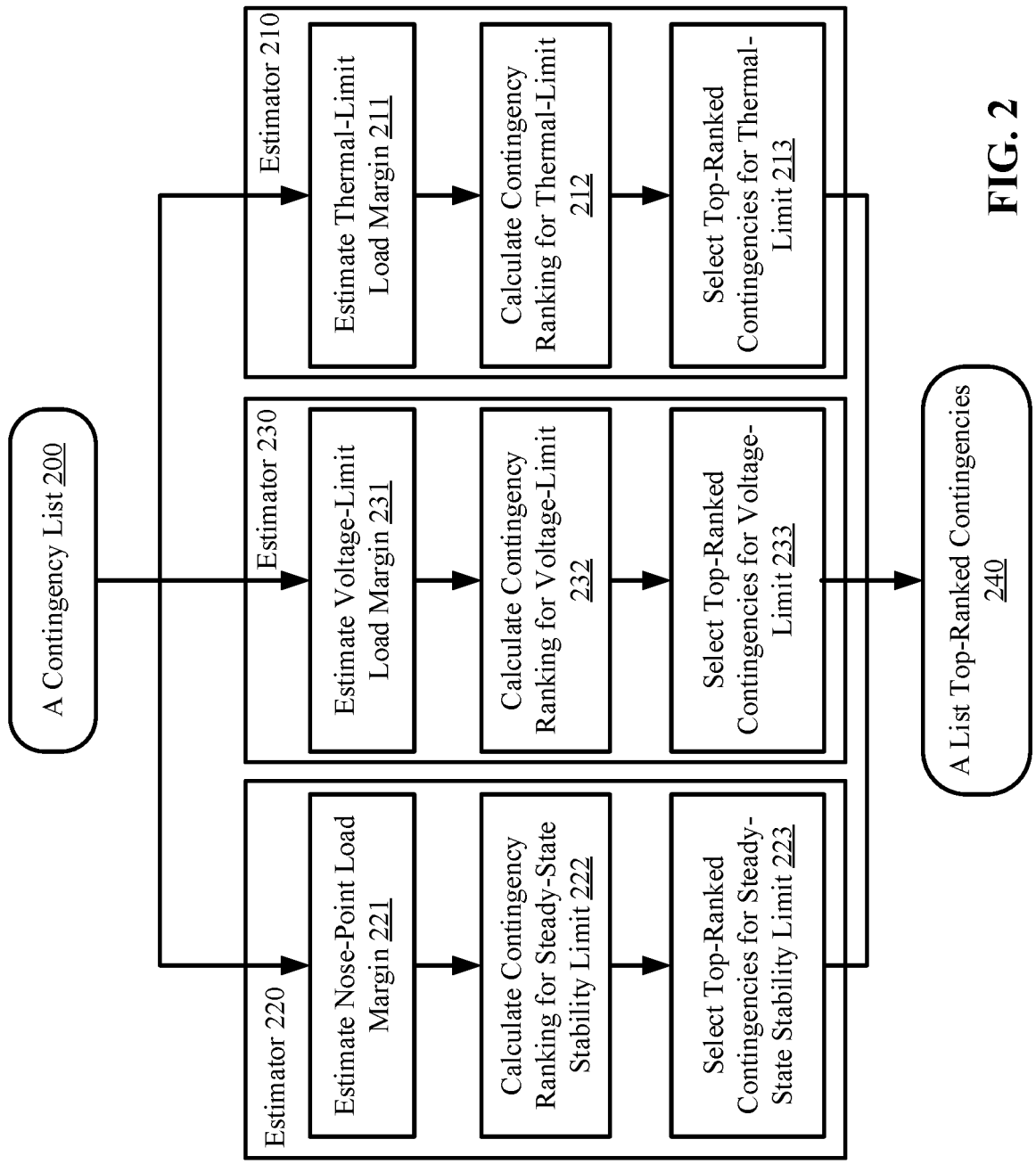
FIG. 2 illustrates three look-ahead estimators according to one embodiment.

FIG. 2 illustrates three fast and accurate look-ahead estimators 210, 220 and 230 according to one embodiment. The look-ahead estimators 210, 220 and 230 can identify and rank critical contingencies in the context of static security assessments. The look-ahead estimator 210 serves to rank the set of all credible contingencies in terms of load (or generation/load) to their branch MVA violations (i.e. thermal limit violations) and to identify the top few critical contingencies for thermal limit violation. The look-ahead estimator 220 ranks the set of all credible contingencies in terms of their load margins to system collapse (i.e. steady-state stability limit) and identifies the top few critical contingencies for violating steady-state stability limit. The look-ahead estimator 230 ranks all credible contingencies in terms of their load margins to bus voltage violation and identifies the few top critical contingencies for voltage violation.

Given (i) the current operating condition (obtained from the state estimator and the topological analyzer), (ii) a proposed power transaction or a proposed set of simultaneous power transactions, (iii) a base case distribution network model with control devices, reactive power generation limits, schemes of real power dispatches, e.g., due to participation factor, etc., (iv) voltage constraints, thermal-limit constraints, steady-state stability limits, and (v) a credible contingency from a contingency list, the three look-ahead estimators 210, 220 and 230 estimate the following three load margins to the three static security limits, along the power transaction vector b for the parameterized distribution network (parameterized along the direction of the power transaction vector) for the distribution network subject to the contingency. The three load margins are:

(LM1) the nose-point load margin, e.g. $\lambda^n$, to measure the distance (MW and/or MVAR) between the current operating point to the nose-point of the parameterized distribution network subject to the contingency, (LM2) a voltage-limit load margin, e.g. $\lambda^v$, to measure the distance (MW and/or MVAR) between the current operating point to the state of the parameterized distribution network subject to the contingency at which the voltage limit constraint at some bus is violated, and (LM3) a thermal-limit load margin, e.g. $\lambda^t$, to measure the distance (MW and/or MVAR) between the current operating point to the state of the parameterized distribution network subject to the contingency at which the thermal limit constraint of some branches is violated.

Each of the above three load margins is applied to rank the contingency list for the following three categories: contingency ranking for steady-state limit, contingency ranking for voltage violation, and contingency ranking for thermal violation. A list of top-ranked contingencies can thus be composed by selecting the top-ranked contingencies from each category.

A detailed description of each stage of FIG. 1 is provided below.

Stage 1: Initialization. At Step 1.1, the power transaction vector b is built to represent (mathematically) the proposed power delivery transaction. At step 1.2, the three phase parameterized power flow equations are formed by incorporating the power transaction vector b into the base-case power flow equations: $f(x)-\lambda b=0$. At step 1.3, the parameter (i.e. the condition number) $\lambda$ is initialized by setting $\lambda=\lambda_0$ to the base case.

Stage 2: Contingency Ranking for Static Security Violation. Referring to FIG. 2, at Step 2.1, the look-ahead estimator 210 is used to rank the set of contingencies L in terms of branch MVA violation. Let the ranked set of contingencies be L(mva). At Step 2.2., the look-ahead estimator 230 is used to rank the set of contingencies L in terms of bus voltage violation. Let the ranked set of contingencies be L(volt). At Step 2.3, the look-ahead estimator 220 is used to rank the set of contingencies L in terms of load margin violation. Let the ranked set of contingencies be L(margin).

Stage 3: Compute first-contingency PDC and identify the corresponding binding constraints. At Step 3.1, the following contingencies are selected: the top $N_a$ contingencies from the ordered set L(mva), the top $N_b$ contingencies from the ordered set L(volt), and the top $N_c$ contingencies from the ordered set L(margin). These contingencies are re-numbered into $l_1, l_2 \ldots, l_{N_a+N_b+N_c}$ and, for duplicate contingencies, only one of the duplicate contingencies is kept. A new set $L_{static} \triangleq \{l_0, l_1, \ldots, l_{N_{total}}\}$ is defined, where $l_0$ represents the base case distribution network.

At Step 3.2, for each contingency in $L_{static}$, for example $l_i$, i=0, 1, 2, . . . , $N_{total}$, the following sub-steps 3.2.1~3.2.4 are performed:

3.2.1 Set j=0.

3.2.2 Use a continuation method that is robust and fast, such as the Continuation Distribution Power Flow (CDFLOW) (see, H. Sheng and H. D. Chiang, "CDFLOW—A Practical Tool for Tracing Stationary Behaviors of General Distribution Networks," *IEEE Transactions on Power System*, vol. 29, no. 3, pp. 1365-1371, 2014, which is herein incorporated by reference) to compute the solutions of the parameterized three phase power flow equations under contingency $l_i$ for each condition number $\lambda_j = \lambda_j + \Delta\lambda_j$, where $\Delta\lambda_j = 0$ if j=0; otherwise $\Delta\lambda_j$ is determined by the step-size control in CDFLOW. If the post-contingency power flow solution $X(l_i, \lambda_j)$ satisfies the following static security constraints: voltage: $V^m \leq V(l_i, \lambda_j) \leq V^M$, line current $I^m \leq I(l_i, \lambda_j) \leq I^m$, and facility loading $g(l_i, \lambda_j) \leq 0$, then set j=j+1 and repeat Step 3.2. Otherwise, set $C_{bind,j}$=the corresponding violated constraints and go to sub-step 3.2.3.

3.2.3 If $|\lambda_j - \lambda_{j-1}| < \varepsilon$, go to sub-step 3.2.4; otherwise, set $$\bar{\lambda}_J = \frac{\lambda_j + \lambda_{j-1}}{2},$$

and use CDFLOW to compute the solutions of the parameterized power flow equations under contingency $l_i$ for the condition number $\lambda_j = \bar{\lambda}_J$. If the post-contingency power flow solution $X(l_i, \bar{\lambda}_J)$ satisfies the static security constraints, then set $\lambda_{j-1} = \bar{\lambda}_J$ and repeat sub-step 3.2.3; otherwise set $\lambda_j = \bar{\lambda}_J$, and $C_{bind,j}$=the corresponding violated constraints and go to sub-step 3.2.3.

3.2.4 Record the contingency $l_j$, the number $\hat{\lambda}_I = \lambda_{j-1}$, and the corresponding violated binding constraint $C_{bind,j}$. Hence, the (first-contingency) available delivery capability under contingency $l_j$ is $\hat{\lambda}_I - \lambda_0$ with the binding constraint $C_{bind,j}$.

3.2.5 If i<$N_{total}$, set i=i+1 and go to Step 3.2.1; otherwise, go to Stage 4.

Stage 4: Re-order the contingency-constrained PDCs and FCIDCs. Rank the set $L_{static}$ according to each value $\hat{\lambda}_I$ obtained in sub-step 3.2.4 and let the ranked contingency set be $\hat{L}_{static} = \{l_1, l_2, \ldots, l_{total}\}$ such that $\bar{\lambda}_1 \geq \bar{\lambda}_2 \geq \ldots \geq \hat{\lambda}_{total}$. The first-contingency PDC (or FCIDC) subject to static voltage stability constraints and static security constraints of the contingency set L is $\lambda_{total} = (\hat{\lambda}_{total} - \lambda_0)$, the corresponding contingency is $l_{total}$ and the associated binding constraint is $C_{total}$. The PDC, under contingency is $l_j$, $\lambda_j = (\hat{\lambda}_I - \lambda_0)$ with the binding constraint $C_{bind,j}$, for j=1, 2, . . . , $N_{total}$−1.

Stage 5: Output Analysis. Output the PDC, FCIDC for the distribution network with the proposed power transactions under each corresponding contingency and the associated binding constraints. PDC can be expressed in a number of ways. It can be expressed in terms of the amount of PDC between source areas and sink areas. On some occasions, it is useful from monitoring and control viewpoint to represent PDC in terms of pre-contingency interface power flows (i.e. the base-case interface power flows) of some distribution interface.

In Stage 4, the value $\hat{\lambda}_I$ is the transaction-dependent PDC for the distribution network subject to the contingency, e.g., j. Physically, if $\hat{\lambda}_I$ is greater than 1.0, then it means that the distribution network is able to deliver the proposed power transactions in a reliable manner, should the contingency j occur. In addition, the (normalized) operating margin of the distribution network with the proposed power transactions is $\hat{\lambda}_I - 1.0$. On the other hand, the distribution network is unable to deliver the proposed power transactions, should the contingency j occur, if $\hat{\lambda}_I$ is less than 1.0. In this case, the amount of reliable power delivery is $\hat{\lambda}_I$ % of the proposed power transactions. For example, if $\hat{\lambda}_I$ equals 0.7, then the available delivery capability for the proposed power transactions is 70% of the proposed power transactions. This (normalized) operating margin can be translated into operational guidelines as follows: the system can reliably delivery the proposed power transaction. In addition, the distribution network can deliver additional $(\hat{\lambda}_I - 1.0)$% of the original proposed power transaction in a reliable manner.

The static PDC can be expressed in several ways. It is sometimes useful to represent the static PDC in terms of pre-contingency interface power flow (i.e. the base-case interface power flow) at the limit point. The calculated system-wide static PDC is then mapped into each interface static PDC.

Figure 3:
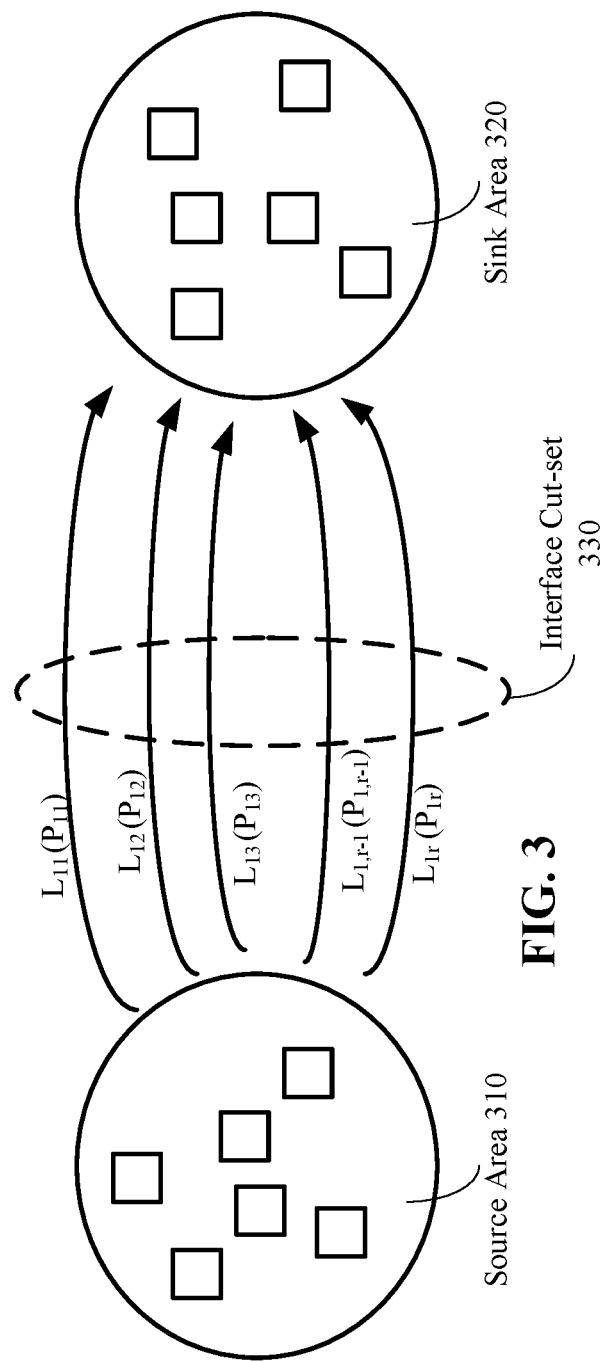
FIG. 3 illustrates the concept of interface cut-sets according to one embodiment.
Figure 4:
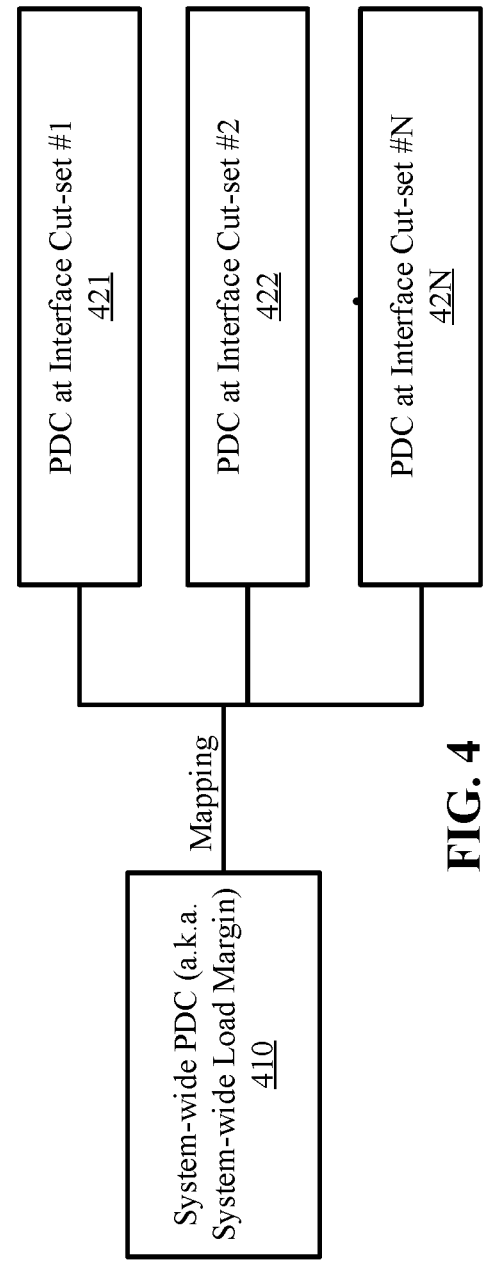
FIG. 4 is a block diagram illustrating a mapping from a system-wide PDC to PDCs at a set of interface according to one embodiment.

A set of interface cut-sets (also referred to as interfaces) can be defined between a source area and a sink area. FIG. 3 illustrates the concept of interface cut-sets according to one embodiment. In FIG. 3, the distribution lines $L_{11}$, $L_{12}, \ldots, L_{lr}$ between a source area 310 and a sink area 320 form an interface cut-set 330. The real power $P_{11}$, $P_{12}, \ldots, P_{lr}$ that flow on the lines in the interface cut-set 330 form the interface flow. The system-wide PDC can be mapped into an interface PDC. Depending on the selection of interface cut-set, the corresponding interface PDC will be different. The interface PDCs are easier to monitor than the system-wide PDC. FIG. 4 is a block diagram illustrating the mapping from a system-wide PDC 400 (a.k.a. system-wide load margin) to PDCs at a set of interface cut-sets 421, 422, ..., 42N, according to one embodiment.

Numerical studies have been conducted on a real NYSEG 394-bus, 1103-node distribution network containing 412 distribution lines, 204 loads, 7 fixed transformers, 1 ULTC transformers, 11 fixed shunts and 2 distributed generators, etc. Given a base case of the distribution network with a secure operating point, a proposed power transaction is described by delivering 16.2 MW real power from source area A and a substation bus to supply the loads of sink area B, the real power penetration from renewable energies at source area A is 2.4 MW, and the shortage of generation will be supplied from the substation bus. We apply the on-line method to evaluate the real power delivery capability from source area A to sink area B of the distribution. Three cut-sets of distribution lines were selected and the corresponding sum of the line flows was defined as the interface flows.

In this numerical study, the PDC is expressed in terms of one of the following: (i) power delivery capability between the source area and the sink area, or (ii) the pre-contingency power flow of the three interface flows, or (iii) the distributed generation penetration level in the source area.

TABLE 1

Output analysis of PDC expressed by system load margin

| ADC | Estimated Margin (MW) | Estimated Lamda | Binding Equipment |
|---|---|---|---|
| ADC due to voltage violation | 6.076 | 0.374963 | 1217 |
| ADC due to thermal limits | 4.547 | 0.280586 | 1003-1004 |
| ADC due to static stability limit | 46.714 | 2.882649 | 1217 |

TABLE 2

Output analysis of PDC expressed by interface power flow

| ADC | Interface #1 (MW) | Interface #2 (MW) | Interface #3 (MW) |
|---|---|---|---|
| ADC due to voltage violation | 2.8383 | 4.7609 | 14.7420 |
| ADC due to thermal limits | 2.6827 | 4.5387 | 13.8548 |
| ADC due to static stability limit | 7.1279 | 10.9873 | 41.0012 |

The final results of ADC, which is the difference between the PDC and the current power flow with respect to the proposed power transaction along with the corresponding binding constraints are shown in Table 3.

TABLE 3

The final results of ADC.

| | Pre-contingency Interface power flow of three interfaces (MW) | | | Corresponding ADC (MW) | Binding Constraints | |
|---|---|---|---|---|---|---|
| Case | #1 | #2 | #3 | | Type | location |
| Base Case | 0.4613 | 0.6571 | 2.6120 | 4.547 | Thermal | 1003-1004 |

The numerical simulation shows that the ADC for the proposed power transaction is 4.547 MW between the source area and the sink area (instead of 16.2 MW). The corresponding binding constraint is the thermal limit on distribution line 1003-1004. Equivalently, the ADC of the proposed transaction is 0.4613 MW for the interface #1, 0.6571 MW for the interface #2, and 2.6120 MW for the interface #3. It is interesting to note that the constrained interface line flow under the binding constraint is the smallest among the three ADCs constrained interface line flows considered. This is also true for the constrained interface #2 line flow and the constrained west interface #3 line flow.

The proposed on-line method can compute each ADC with the associated violated constraint as shown in Table 3. This piece of information is useful for decision-making personnel to take a proactive approach to measure the delivery capability of the network. For instance, the ADC of the study system is 4.547 MW. In order to supply the proposed power transaction, enhancement control actions need to be taken to increase the ADC and eliminate violations. It should be also pointed out that this on-line method also allows (via the establishment of Table 3) a probabilistic treatment of each contingency and the associated risk management. Economic factors can also be linked to Table 3.

Real-Time Static PDC in 2-Dimensional Nomogram. A static PDC nomogram is a two-dimensional display of static PDC in terms of two interface flows. Nomograms provide vital information for distribution network operators to operate distribution networks within power distribution static security limits and with a comfort zone. A nomogram involves two interface paths. In computing a nomogram, one interface path is associated with the X axis and the other interface path is associated with the Y axis. Then all source generators involved in the stress pattern are separated into two groups. The source group that is responsible for the flow change in the X axis path is classified as group X, which is denoted as $G_1$. The source group that is responsible for the power flow change in the Y axis path is classified as group Y, which is denoted as $G_2$.

In one embodiment, the static PDC nomogram may be computed in the following way. First, two independent base generation vectors $b_{g1}$, $b_{g2}$ are created for $G_1$ and $G_2$ respectively. Then, two independent coefficients are created as $a_1$, $a_2$, respectively. The overall generation vector considering both source groups is:

$$b_g = a_1 b_{g1} + a_2 b_{g2} \tag{6}$$

By assigning $a_1$, $a_2$ different values, a family of generation/load stress patterns are created. The family of generation/load stress patterns span the entire feasible generation/load stress space. For each generation/load stress pattern, the CDFLOW may be used to compute the voltage stability load margin (i.e. the boundary of the nomogram along the stress pattern).

A method for computing the static PDC nomogram is as follows:

Step 1: Separate source generators into two groups $G_1$ and $G_2$, and assign $a_1=0$ and $a_2=1$.

Step 2: Compute $b_g$ using equation (6).

Step 3: Use the previously described on-line ADC method 100 (FIG. 1) to compute the one-dimensional system-wide static PDC and the corresponding interface static PDCs along the direction $b_g$.

Step 4: Assign different values for $a_1$ and $a_2$ in equation (6) and repeat Step 2 to Step 3 to compute all points on the nomogram boundary (i.e. curve).

Step 5: Export the static PDC nomogram curve and the corresponding contingency of each computed point on the nomogram boundary.

FIG. 5 illustrates a stress pattern that spans the entire feasible generation/load stress space according to one embodiment. The static PDC nomogram can be expressed in several ways. FIG. 6 illustrates a real-time static ADC in a two-dimensional map (i.e. in a nomogram) according to one embodiment.

It is sometimes useful to represent the static PDC nomogram in terms of pre-contingency interface power flow (i.e. the base-case interface power flow) at the limit point. The calculated system-wide static PDC nomogram is then mapped into each interface static PDC nomogram.

Real-Time Static ADC Determination System. The real-time ADC is the difference between the real-time PDC and the current actual power flow. To provide a real-time static ADC (i.e. ADC subject to static security constraints and voltage security constraints), it is necessary to have some real-time information regarding a system's operating conditions. In one embodiment, a synchronized measurement system (SMS) such as micro phasor measurement units (Micro-PMUs) may be installed at selected distribution-lines and buses to obtain the required real-time real power and reactive power information. The measurements of the Micro-PMUs may be used as input to a real-time ADC determination system. In one embodiment, the output of the real-time ADC determination system may include one-dimensional real-time static ADC. In another embodiment, the output of the real-time ADC determination system may include two-dimensional real-time static ADC.

FIG. 7 illustrates the computation of one-dimensional real-time static ADC according to one embodiment. A micro-PMU measurement 710 at interface # K and a real-time static PDC 720 at interface # K, computed from the on-line method 100 of FIG. 1, are received by a difference calculator 730 as two inputs. The difference calculator 730 calculates the difference between the two inputs, and outputs a real-time static ADC 740 at interface # K.

One central topic in the area of synchronized measurement is the utilization of this new type of measurement (as opposed to traditional Supervisory Control and Data Acquisition (SCADA) measurements), phasor data, precisely time-synchronized data at a high data rate, provide a wide-area view of current distribution network conditions. To fill the gap between real-time phasor measurements and on-line operation applications, an integrated system is developed which contains a synchronized measurement system and the on-line PDC system for an accurate determination of real-time ADC. This real-time ADC determination ensures distribution network security and reliability while offers better distribution network asset utilization and economic benefits.

Figure 8:
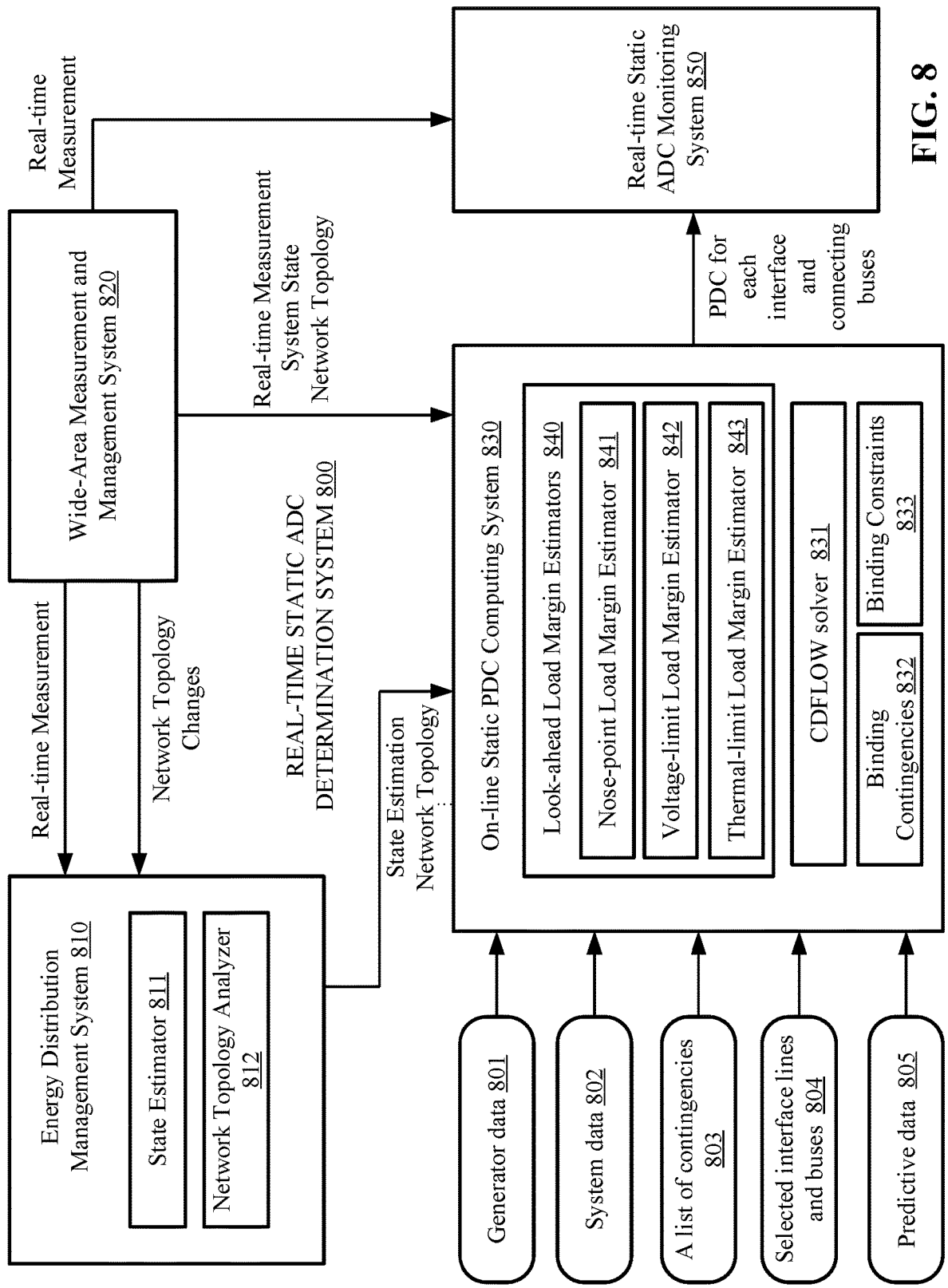
FIG. 8 illustrates the architecture of a real-time static ADC determination system according to one embodiment.

The architecture of a real-time static ADC determination system 800 is shown in FIG. 8 according to one embodiment. Given an operating point (derived from a state estimator), a network topology, a set of pre-determined interfaces and a contingency list associated with each interface, a Micro-PMU-assisted, real-time static ADC determination system is developed for each cut-set interface.

In this embodiment, there are four key components in the real-time static ADC determination system 800: a state estimator 811 and a network topology analyzer 812 in an energy distribution management system 810, an on-line static PDC computation system 830 for computing on-line static PDC (e.g., using the method 100 of FIG. 1), a wide-area measurement and management system 820 that includes real-time measurement units (e.g. Micro-PMUs) placed at various locations including a set of pre-determined interfaces, and a real-time static ADC monitoring system 850. The real-time static ADC monitoring system 850 may monitor one-dimensional real-time static ADC, two-dimensional real-time static ADC, or both.

The energy distribution management system 810 provides the on-line static PDC computation system 830 with state estimation, network topology, and other information in the distribution network. The wide-area measurement and management system 820 provides real-time measurements and topology change information to the energy distribution management system 810, real-time measurements, system state and network topology to the on-line static PDC computation system 830, and real-time measurements to the real-time static ADC monitoring system 850. The on-line static PDC computation system 830 receives generator data 801, system data 802, a list of contingencies 803, selected interface lines and buses 804 and predictive data 805 in addition to the information received from systems 810 and 820 as input, and outputs PDC for each interface and connecting buses to the real-time static ADC monitoring system 850. The on-line static PDC computation system 830 includes look-ahead load margin estimators 840, which further includes a nose-point load margin estimator 841, a voltage-limit load margin estimator 842 and a thermal-limit load margin estimator 843. The on-line static PDC computation is further based on a continuation method solver such as a CDFLOW solver 831, binding contingencies 832 and binding constraints 833.

It is pointed out that the on-line ADC methods of the disclosed system can also determine the top-ranked interface static power delivery limit of each selected interface under the contingency list associated with each interface.

This real-time static ADC determination system has the following features. The real-time static security ADC calculation methodology determines the top-ranked system-wide power delivery limits subject to static security constraints of a contingency list. The system identifies, for each top-ranked power delivery limit, the corresponding limiting contingency and the corresponding binding constraint. The system maps each top-ranked system-wide power delivery limit into the power delivery limit of each selected cut-set interface under the contingency. The real-time measurement of power flow across each selected interface is obtained from the installed Micro-PMUs. For each limiting contingency, the difference between the corresponding power delivery limit and the current power delivery is the real-time available delivery capability of the system associated with the top limiting contingency and the corresponding binding constraint expressed as the power flow across each interface.

The distinguished features of the on-line static ADC method performed by the integrated system can be characterized from the following four viewpoints.

Functional Viewpoint. The ADC method computes ADC and first contingency incremental delivery capability (FCIDC), and identifies the corresponding (e.g. the most severe) contingency and the associated binding constraints. The ADC method also identifies and ranks the top severe contingencies in terms of their impacts on ADC and FCIDC. For each ranked contingency, The ADC method computes ADC and FCIDC of the distribution network subject to the contingency and the associated binding constraint. Moreover, the ADC method identifies the bottlenecks of ADC in terms of locations of bottlenecks, types of binding constraint and the corresponding contingency, handles all the static security constraints of a given contingency list, and determines the required ancillary services.

Probabilistic Analysis Viewpoint. The ADC method allows a probabilistic treatment of each contingency to compute ADC and FCIDC.

Model Viewpoint. The ADC method is based on a full distribution network nonlinear modeling. It takes into account the effects of control devices, and models the general characteristic of distribution network operating environments.

Control Viewpoint. The ADC method offers a highly effective environment for the development of control schemes to increase ADC and FCIDC, and provides a platform to take proactive actions in computing ADC and FCIDC and to prepare remedy control.

Figure 9:
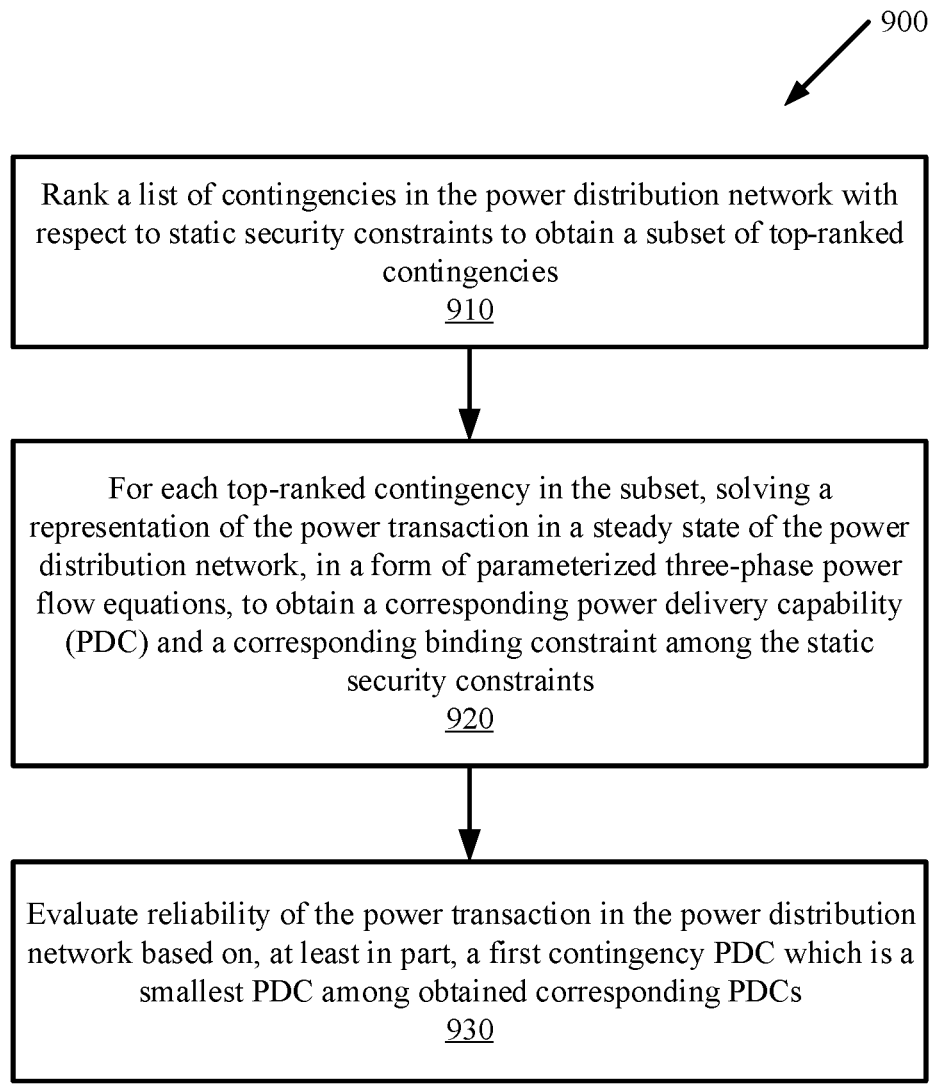
FIG. 9 is a flow diagram illustrating a method for real-time evaluation of available delivery capability of a power distribution network with respect to a power transaction according to an embodiment.

FIG. 9 illustrates a flowchart of a method 900 for real-time evaluation of available delivery capability of a power distribution network with respect to a power transaction according to one embodiment. The power transaction includes simultaneous power deliveries from a collection of power sources in a source area to a collection of loads in a sink area. In one embodiment, the method 900 begins with a computing system ranking a list of contingencies in the power distribution network with respect to static security constraints to obtain a subset of top-ranked contingencies (step 910). For each top-ranked contingency in the subset, the computing system solves a representation of the power transaction in a steady state of the power distribution network, in a form of parameterized three-phase power flow equations, to obtain a corresponding PDC and a corresponding binding constraint among the static security constraints (step 920). The computing system evaluates the reliability of the power transaction in the power distribution network based on, at least in part, a first contingency PDC which is a smallest PDC among obtained corresponding PDCs (step 930).

One or more parts of an embodiment of the invention may be implemented using different combinations of software, firmware, and/or hardware. In one embodiment, the methods described herein may be performed by a processing system. One example of a processing system is a computer system 1000 of FIG. 10.

Figure 10:
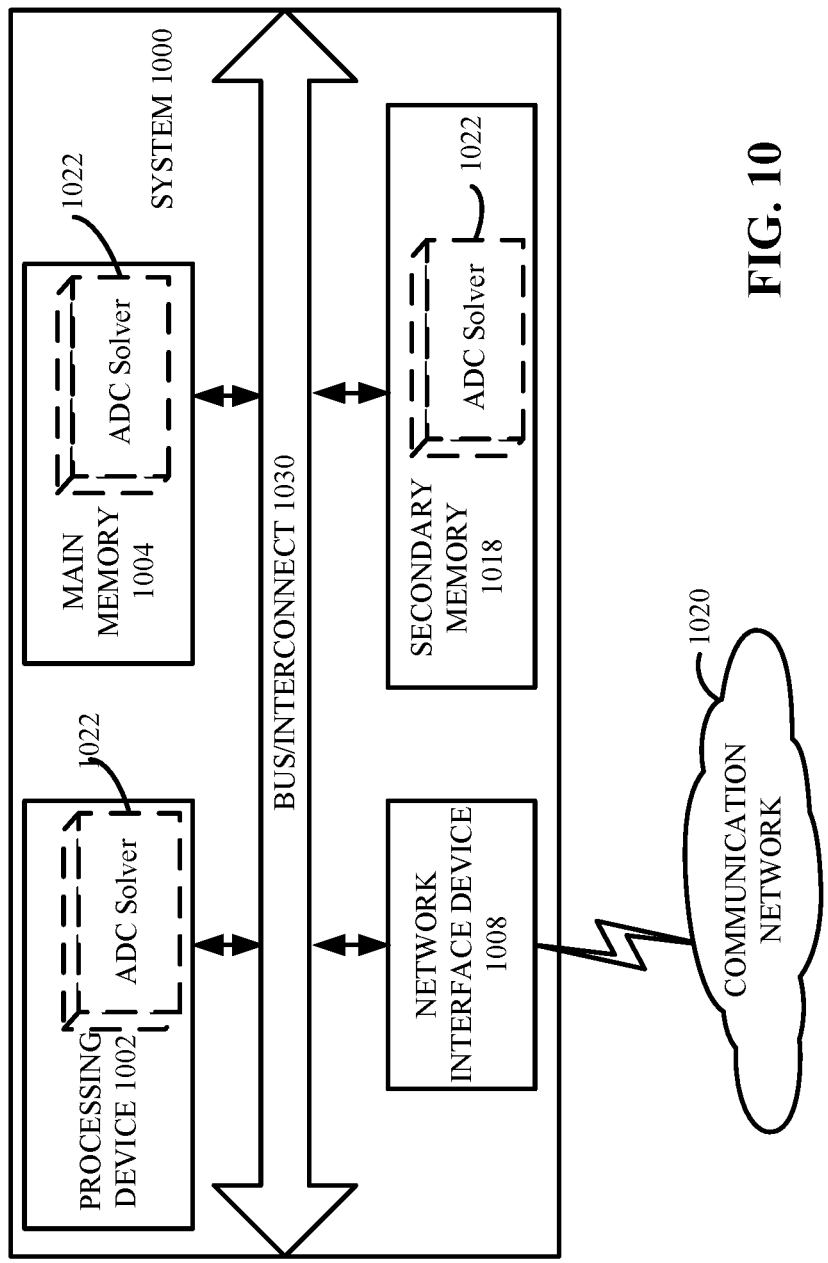
FIG. 10 is a block diagram illustrating an example of a computer system according to an embodiment.

Referring to FIG. 10 the computer system 1000 may be a server computer, or any machine capable of executing a set of instructions (sequential or otherwise) that specify actions to be taken by that machine. While only a single machine is illustrated, the term "machine" shall also be taken to include any collection of machines (e.g., computers) that individually or jointly execute a set (or multiple sets) of instructions to perform any one or more of the methodologies discussed herein.

The computer system 1000 includes a processing device 1002. The processing device 1002 represents one or more general-purpose processors, or one or more special-purpose processors, or any combination of general-purpose and special-purpose processors. In one embodiment, the processing device 1002 is adapted to execute the operations of a smart power flow solver, which performs the methods described herein.

In one embodiment, the processor device 1002 is coupled, via one or more buses or interconnects 1030, to one or more memory devices such as: a main memory 1004 (e.g., read-only memory (ROM), flash memory, dynamic random access memory (DRAM), a secondary memory 1018 (e.g., a magnetic data storage device, an optical magnetic data storage device, etc.), and other forms of computer-readable media, which communicate with each other via a bus or interconnect. The memory devices may also different forms of read-only memories (ROMs), different forms of random access memories (RAMs), static random access memory (SRAM), or any type of media suitable for storing electronic instructions. In one embodiment, the memory devices may store the code and data of an ADC solver 1022 for performing the aforementioned on-line ADC method. The ADC solver 1022 which may be stored in one or more of the locations shown as dotted boxes and labeled as ADC solver 1022.

The computer system 1000 may further include a network interface device 1008. A part or all of the data and code of the ADC solver 1022 may be received over a network 1020 via the network interface device 1008. Although not shown in FIG. 10, the computer system 1000 also may include user input/output devices (e.g., a keyboard, a touch screen, speakers, and/or a display).

In one embodiment, the computer system 1000 may store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals—such as carrier waves, infrared signals).

In one embodiment, a non-transitory computer-readable medium stores thereon instructions that, when executed on one or more processors of the computer system 1000, cause the computer system 1000 to perform the method 100 of FIG. 1 and the method 900 of FIG. 9.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A computer-implemented method for real-time evaluation of available delivery capability of a power distribution network with respect to a power transaction, wherein the power transaction includes simultaneous power deliveries from a collection of power sources in a source area to a collection of loads in a sink area, the method comprising:
ranking a list of contingencies in the power distribution network with respect to static security constraints to obtain a subset of top-ranked contingencies;
for each top-ranked contingency in the subset, solving a representation of the power transaction in a steady state of the power distribution network, in a form of parameterized three-phase power flow equations, to obtain a corresponding power delivery capability (PDC) and a corresponding binding constraint among the static security constraints; and evaluating reliability of the power transaction in the power distribution network based on, at least in part, a first contingency PDC which is a smallest PDC among obtained corresponding PDCs, wherein evaluating reliability of the power transaction further comprises:
identifying an interface between the source area and the sink area in the power distribution network to monitor the power transaction, wherein the interface includes a set of distribution lines on which real power flows; and
measuring an amount of the real power that flows through the interface, and wherein measuring the amount of the real power further comprises:
performing real-time phasor measurements at the interface; and
calculating a difference between the real-time phasor measurements and the first contingency PDC at the interface to obtain an available delivery capacity (ADC).

2. The method of claim 1, wherein solving the parameterized three-phase power flow equations further comprises:
receiving input information including a current operating condition of the power distribution network, a base case of a distribution network model, real and reactive load demands at each of a plurality of load buses, and real power generation at each of a plurality of generator buses.

3. The method of claim 1, wherein the static security constraints comprise: thermal limit constraints, bus voltage limit constraints and steady-state stability constraints.

4. The method of claim 1, wherein ranking the list of contingencies further comprises:
estimating a nose-point load margin;
estimating a voltage-limit load margin; and
estimating a thermal-limit load margin.

5. The method of claim 4, wherein ranking the list of contingencies further comprises:
parameterizing the power distribution network along a direction of a power transaction vector to obtain a parameterized distribution network; and
for each contingency in the list of contingencies, the method further comprising:
measuring a first distance between a current operating point to a nose point of the parameterized distribution network subject to the contingency to estimate the nose-point load margin,
measuring a second distance between the current operating point to a state of the parameterized distribution network subject to the contingency at which a voltage constraint at a bus is violated to estimate the voltage-limit load margin, and
measuring a third distance between the current operating point to another state of the parameterized distribution network subject to the contingency at which a thermal constraint of a branch is violated to estimate the thermal-limit load margin.

6. The method of claim 1, further comprising:
identifying a first group of source generators responsible for flow change in a first axis path;
identifying a second group of source generators responsible for the flow change in a second axis path;

creating two independent base generation vectors for the first group and the second group; and
forming an overall generation vector including the two independent base generation vectors with respective independent coefficients.

7. The method of claim 6, further comprising:
computing points along a boundary of a static PDC nomogram based on the obtained corresponding PDCs along a direction of the overall generation vector.

8. A computer-implemented method for real-time evaluation of available delivery capability of a power distribution network with respect to a power transaction, wherein the power transaction includes simultaneous power deliveries from a collection of power sources in a source area to a collection of loads in a sink area, the method comprising:
ranking a list of contingencies in the power distribution network with respect to static security constraints to obtain a subset of top-ranked contingencies;
for each top-ranked contingency in the subset, solving a representation of the power transaction in a steady state of the power distribution network, in a form of parameterized three-phase power flow equations, to obtain a corresponding power delivery capability (PDC) and a corresponding binding constraint among the static security constraints; and
evaluating reliability of the power transaction in the power distribution network based on, at least in part, a first contingency PDC which is a smallest PDC among obtained corresponding PDCs,
wherein solving the representation of the power transaction further comprises:
solving the parameterized three phase power flow equations under a top-ranked contingency in the subset for a first condition number;
when none of the static security constraints is violated, solving the parameterized three phase power flow equations under a next top-ranked contingency in the subset for a next condition number;
when at least one of the static security constraints is violated, identifying a corresponding condition number; and
ranking the subset of top-ranked contingencies according to corresponding condition numbers.

9. A non-transitory computer readable storage medium comprising instructions which, when executed by a computing system, cause the computing system to perform a method for real-time evaluation of available delivery capability of a power distribution network with respect to a power transaction, wherein the power transaction includes simultaneous power deliveries from a collection of power sources in a source area to a collection of loads in a sink area, the method comprising:
ranking a list of contingencies in the power distribution network with respect to static security constraints to obtain a subset of top-ranked contingencies;
for each top-ranked contingency in the subset, solving a representation of the power transaction in a steady state of the power distribution network, in a form of parameterized three-phase power flow equations, to obtain a corresponding power delivery capability (PDC) and a corresponding binding constraint among the static security constraints; and
evaluating reliability of the power transaction in the power distribution network based on,
at least in part, a first contingency PDC which is a smallest PDC among obtained corresponding PDCs, wherein evaluating reliability of the power transaction further comprises:
identifying an interface between the source area and the sink area in the power distribution network to monitor the power transaction, wherein the interface includes a set of distribution lines on which real power flows; and
measuring an amount of the real power that flows through the interface, and
wherein measuring the amount of the real power further comprises:
performing real-time phasor measurements at the interface; and
calculating a difference between the real-time phasor measurements and the first contingency PDC at the interface to obtain an available delivery capacity (ADC).

10. The non-transitory computer readable storage medium of claim 9, wherein solving the parameterized three-phase power flow equations further comprises:
receiving input information including a current operating condition of the power distribution network, a base case of a distribution network model, real and reactive load demands at each of a plurality of load buses, and real power generation at each of a plurality of generator buses.

11. The non-transitory computer readable storage medium of claim 9, wherein the static security constraints comprise: thermal limit constraints, bus voltage limit constraints and steady-state stability constraints.

12. The non-transitory computer readable storage medium of claim 9, wherein ranking the list of contingencies further comprises:
estimating a nose-point load margin;
estimating a voltage-limit load margin; and
estimating a thermal-limit load margin.

13. The non-transitory computer readable storage medium of claim 12, wherein ranking the list of contingencies further comprises:
parameterizing the power distribution network along a direction of a power transaction vector to obtain a parameterized distribution network; and
for each contingency in the list of contingencies, the method further comprising:
measuring a first distance between a current operating point to a nose point of the parameterized distribution network subject to the contingency to estimate the nose-point load margin,
measuring a second distance between the current operating point to a state of the parameterized distribution network subject to the contingency at which a voltage constraint at a bus is violated to estimate the voltage-limit load margin, and
measuring a third distance between the current operating point to another state of the parameterized distribution network subject to the contingency at which a thermal constraint of a branch is violated to estimate the thermal-limit load margin.

14. The non-transitory computer readable storage medium of claim 9, wherein solving the representation of the power transaction further comprises:
solving the parameterized three phase power flow equations under a top-ranked contingency in the subset for a first condition number;
when none of the static security constraints is violated, solving the parameterized three phase power flow equations under a next top-ranked contingency in the subset for a next condition number;
when at least one of the static security constraints is violated, identifying a corresponding condition number; and
ranking the subset of top-ranked contingencies according to corresponding condition numbers.

15. The non-transitory computer readable storage medium of claim 9, further comprising:
identifying a first group of source generators responsible for flow change in a first axis path;
identifying a second group of source generators responsible for the flow change in a second axis path;
creating two independent base generation vectors for the first group and the second group; and
forming an overall generation vector including the two independent base generation vectors with respective independent coefficients.

16. The non-transitory computer readable storage medium of claim 15, further comprising:
computing points along a boundary of a static PDC nomogram based on the obtained corresponding PDCs along a direction of the overall generation vector.

* * * * *